(No Model.)

P. G. SALOM.
PROCESS OF MAKING LITHARGE OR PROTOXID OF LEAD FROM LEAD ORE.

No. 588,883. Patented Aug. 24, 1897.

Witnesses:
Will. A. Barr.
Hamilton D. Turner

Inventor:
Pedro G. Salom
by his Attorneys
Howson & Howson

UNITED STATES PATENT OFFICE.

PEDRO G. SALOM, OF PHILADELPHIA, PENNSYLVANIA.

PROCESS OF MAKING LITHARGE OR PROTOXID OF LEAD FROM LEAD ORE.

SPECIFICATION forming part of Letters Patent No. 588,883, dated August 24, 1897.

Application filed June 29, 1897. Serial No. 642,864. (No specimens.)

*To all whom it may concern:*

Be it known that I, PEDRO G. SALOM, a citizen of the United States, residing in Philadelphia, Pennsylvania, have invented a certain Improved Process of Making Litharge or Protoxid of Lead from Lead Ore, of which the following is a specification.

The object of my invention is to manufacture litharge or protoxid of lead in a more acceptable manner than usual, an object which I attain by subjecting lead ore, such as galena, (sulfid of lead,) to the reducing action of hydrogen evolved by electrolytic action, thereby producing a spongy lead, then gradually drying the sponge, and then heating it to produce the litharge or protoxid of lead.

Figure 1:
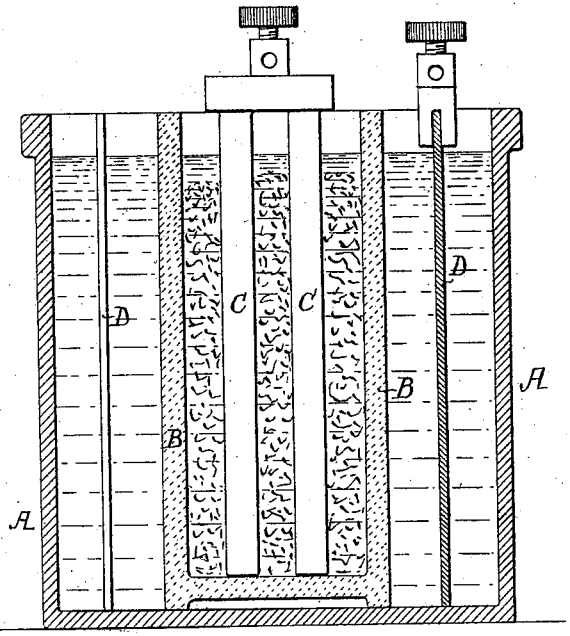
Figure 2:
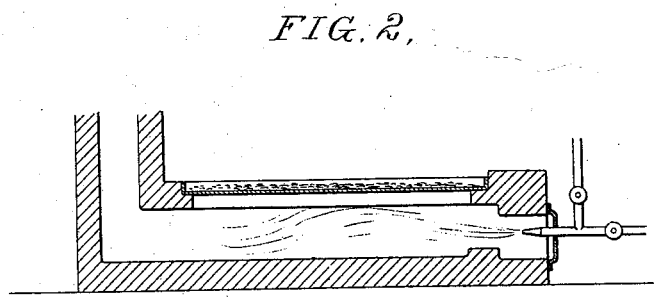

In the accompanying drawings, Figure 1 represents a sectional elevation of apparatus which may be employed in carrying out the first step of my invention, and Fig. 2 is a view showing one form of apparatus which may be used in carrying out the second step of the process.

While I have illustrated apparatus for carrying my invention into effect, it should be understood that the invention is not limited thereto, as different forms of apparatus available for the purpose will readily suggest themselves to those skilled in the art.

A represents a suitable vessel containing electrolytic fluid, which, if the ore being treated is a sulfid, may consist of an aqueous solution of sulfuric acid.

Within the vessel A is a porous cup B, in which is placed the lead ore from which the metal is to be reduced, the ore having preferably been powdered before being placed in the vessel. Within the porous cup B is a cathode C, consisting in the present instance of two or more bars of lead connected to the negative pole of a dynamo, electric machine, or other suitable generator of electricity.

Immersed in the electrolytic fluid is an anode D, consisting in the present instance of a plate of lead connected to the positive pole of the electric generator.

The apparatus above described being supplied with the lead ore to be operated on and connected with the electric generator the operation will be as follows: The electric current passing through the positive electrode D and thence through the electrolyte to the negative electrode or cathode C will there liberate hydrogen, which acts to reduce the metal from the ore under treatment by liberating therefrom (if the ore under treatment be a sulfid) sulfur, which, combining with the hydrogen, passes off in the form of sulfureted hydrogen, leaving in the porous cup a spongy metallic lead, which may be removed therefrom at the close of the operation or from time to time as the reduction proceeds.

It will be understood that various substances may be used to form the electrodes, and also that the electrolytic fluid may be varied according to the character of the ore to be treated, having always in view the employment of the electrolytic fluid simply as a conductor and for the development of nascent hydrogen, and the action of the latter upon the ore.

After obtaining the spongy lead in the manner above set forth it is thoroughly washed, then gradually dried, and then subjected to heat in the open air in any suitable vessel or furnace, preferably such a furnace as is shown in Fig. 2, which consists simply of a fire-chamber, mounted above which is a sheet of iron upon which the spongy lead is placed.

The heat is first maintained at a temperature below the melting-point of metallic lead in order to prevent the running together of small globules of metallic lead, which could afterward be oxidized only with difficulty and at the expense of further heat and time. After the treatment under low temperature has been continued until there is no further likelihood of the formation of these globules of metallic lead the temperature is raised to a bright-red heat, whereupon all of the spongy lead is oxidized and litharge ($Pb.O$) is formed.

I claim as my invention—

The process of converting lead ore into litharge or protoxid of lead, said process consisting in subjecting the ore to the action of nascent hydrogen electrolytically developed, producing thereby a spongy mass, then heating the said spongy mass in the open air first at a temperature below the melting-point of metallic lead and afterward to a higher temperature, substantially as specified.

In testimony whereof I have signed my name to this specification in the presence of two subscribing witnesses.

PEDRO G. SALOM.

Witnesses:
 WILL. A. BARR,
 JOS. H. KLEIN.